(12) United States Patent
Kapur et al.

(10) Patent No.: US 12,452,826 B2
(45) Date of Patent: Oct. 21, 2025

(54) SYSTEMS AND METHODS FOR CONTROLLING ELECTRONIC COMMUNICATIONS IN REAL TIME VIA AN ARTIFICIAL INTELLIGENCE ENGINE BASED ON LOCATION DATA AND USER DATA

(71) Applicant: BANK OF AMERICA CORPORATION, Charlotte, NC (US)

(72) Inventors: Monika V. Kapur, Jacksonville, FL (US); Christine D. Black, Brooksville, ME (US); Jinna Zevulun Kim, Charlotte, NC (US); Jennifer Tiffany Renckert, Middleburg, FL (US); Jo-Ann Taylor, Godalming (GB); Vijaya L. Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 485 days.

(21) Appl. No.: 17/960,581

(22) Filed: Oct. 5, 2022

(65) Prior Publication Data

US 2024/0121750 A1    Apr. 11, 2024

(51) Int. Cl.
*G06Q 30/02* (2023.01)
*G06Q 30/0207* (2023.01)
(Continued)

(52) U.S. Cl.
CPC ...... *H04W 64/003* (2013.01); *G06Q 30/0224* (2013.01); *G06Q 30/0261* (2013.01); *H04W 76/10* (2018.02)

(58) Field of Classification Search
CPC ..... H04W 64/003; H04W 76/10; H04W 4/02; G06Q 30/0224; G06Q 30/0261; G06N 3/00
See application file for complete search history.

(56) References Cited

U.S. PATENT DOCUMENTS 9,270,696 B2    2/2016    Fritzson
9,356,947 B2    5/2016    Shraim
(Continued)

FOREIGN PATENT DOCUMENTS

EP    1999609 B1    3/2018

OTHER PUBLICATIONS

"Creating an AI-Powered Marketing Solution for Sentiment Analysis and Engagement" (Barbitta, Zach; published on Aug. 16, 2018 at https://aws.amazon.com/blogs/messaging-and-targeting/creating-an-ai-poweredmarketing-solution-for-sentiment-analysis-and-engagement/) teaches (Year: 2018).*

*Primary Examiner* — James M Detweiler
(74) *Attorney, Agent, or Firm* — Moore & Van Allen PLLC; R.W. McCord Rayburn

(57) ABSTRACT

Systems, computer program products, and methods are described herein for controlling electronic communications in real time via an artificial intelligence engine based on location data and user data. The present invention may be configured to determine a location of a user device associated with a user based on location data generated by the user device and determine, using an emotional artificial intelligence engine, an emotional state of the user based on user data. The present invention may be configured to determine resources associated with the user and identify, from the resources associated with the user, relevant resources associated with an entity in proximity to the location of the user device. The present invention may be configured to generate, based on the emotional state of the user, notifications including information regarding the relevant resources and present, using an output device of the user device, the notifications to the user.

20 Claims, 3 Drawing Sheets

(51) Int. Cl.
  *G06Q 30/0251* (2023.01)
  *H04W 64/00* (2009.01)
  *H04W 76/10* (2018.01)

(56) References Cited

U.S. PATENT DOCUMENTS

| | | | |
|---|---|---|---|
| 9,635,052 | B2 | 4/2017 | Hadnagy |
| 9,684,888 | B2 | 6/2017 | Shraim |
| 9,787,714 | B2 | 10/2017 | Bach |
| 10,033,693 | B2 | 7/2018 | Sengupta |
| 10,158,677 | B1 | 12/2018 | DiCorpo |
| 10,193,923 | B2 | 1/2019 | Wright |
| 10,404,745 | B2 | 9/2019 | Verma |
| 10,574,684 | B2 | 2/2020 | Segal |
| 10,805,314 | B2 | 10/2020 | Jakobsson |
| 10,868,820 | B2 | 12/2020 | Sites |
| 10,924,517 | B2 | 2/2021 | Epple |
| 10,944,789 | B2 | 3/2021 | Correa Bahnsen |
| 11,044,267 | B2 | 6/2021 | Jakobsson |
| 11,159,558 | B2 | 10/2021 | Basavapatna |
| 2011/0225257 | A1* | 9/2011 | Tilden ............... G06Q 50/14 709/207 |
| 2014/0257945 | A1* | 9/2014 | Sandridge ............ G06Q 50/01 705/14.4 |
| 2014/0372197 | A1* | 12/2014 | Muhammad ....... G06Q 30/0643 705/14.33 |
| 2017/0063920 | A1 | 3/2017 | Thomas |
| 2017/0161728 | A1* | 6/2017 | Satyanarayan ...... G06Q 20/363 |
| 2018/0101860 | A1* | 4/2018 | Fleming ............ G06Q 30/0239 |
| 2018/0181991 | A1* | 6/2018 | Appakutty ........ G06Q 30/0261 |
| 2018/0276710 | A1* | 9/2018 | Tietzen ............ G06Q 30/0269 |
| 2020/0311265 | A1 | 10/2020 | Jones |
| 2021/0035140 | A1* | 2/2021 | Fuzayloff ................ G06F 40/40 |
| 2021/0185078 | A1 | 6/2021 | Sjouwerman |
| 2022/0019996 | A1* | 1/2022 | McCuskey ......... G06Q 20/3223 |
| 2022/0020051 | A1* | 1/2022 | Aruga ................... G06Q 50/40 |
| 2022/0222711 | A1* | 7/2022 | Proctor, Jr. ........ G06Q 30/0266 |

\* cited by examiner

SYSTEMS AND METHODS FOR CONTROLLING ELECTRONIC COMMUNICATIONS IN REAL TIME VIA AN ARTIFICIAL INTELLIGENCE ENGINE BASED ON LOCATION DATA AND USER DATA

FIELD OF THE INVENTION

The present invention embraces systems and methods for controlling electronic communications in real time via an artificial intelligence engine based on location data and user data.

BACKGROUND

An electronic system may be configured to generate notifications including information regarding resources associated with a user. For example, the electronic system may be configured to generate the notifications and present the notifications to the user via a user device.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for controlling electronic communications in real time via an artificial intelligence engine based on location data and user data. The system may include at least one processing device, and at least one non-transitory storage device may include computer-executable program code that, when executed by the at least one processing device, causes the at least one processing device to determine a location of a user device associated with a user based on location data generated by the user device and determine, using an emotional artificial intelligence engine, an emotional state of the user based on user data. The at least one non-transitory storage device may include computer-executable program code that, when executed by the at least one processing device, causes the at least one processing device to determine resources associated with the user and identify, from the resources associated with the user, relevant resources associated with an entity in proximity to the location of the user device. The at least one non-transitory storage device may include computer-executable program code that, when executed by the at least one processing device, causes the at least one processing device to generate, based on the emotional state of the user, notifications including information regarding the relevant resources and present, using an output device of the user device, the notifications to the user.

In some embodiments, the at least one non-transitory storage device may include computer-executable program code that, when executed by the at least one processing device, causes the at least one processing device to receive the location data from the user device.

In some embodiments, the at least one non-transitory storage device may include computer-executable program code that, when executed by the at least one processing device, causes the at least one processing device to receive the location data from a Global Positioning System (GPS) receiver module.

In some embodiments, the user data may include input data manually input to the user device by the user, audio data collected by the user device, local operator data stored in the user device, remote operator data stored remotely from the user device, and/or the like.

In some embodiments, the at least one non-transitory storage device may include computer-executable program code that, when executed by the at least one processing device, causes the at least one processing device to, when determining, using the emotional artificial intelligence engine, the emotional state of the user, determine, using the emotional artificial intelligence engine, the emotional state of the user based on the user data and based on the location data. Additionally, or alternatively, the at least one non-transitory storage device may include computer-executable program code that, when executed by the at least one processing device, causes the at least one processing device to, when determining, using the emotional artificial intelligence engine, the emotional state of the user, determine, using the emotional artificial intelligence engine, the emotional state of the user based on terminology used by the user and based on the location data, where the terminology includes at least one of words and phrases used by the user. In some embodiments, the at least one non-transitory storage device may include computer-executable program code that, when executed by the at least one processing device, causes the at least one processing device to, when determining, using the emotional artificial intelligence engine, the emotional state of the user, determine, using the emotional artificial intelligence engine, the emotional state of the user based on terminology used by the user, based on a tone of voice used by the user, and based on the location data, where the terminology includes at least one of words and phrases used by the user.

In some embodiments, the at least one non-transitory storage device may include computer-executable program code that, when executed by the at least one processing device, causes the at least one processing device to, when determining the resources associated with the user, determine offers, discounts, cash equivalents, rewards, credits, and/or the like that the user owns or for which the user is eligible.

In some embodiments, the at least one non-transitory storage device may include computer-executable program code that, when executed by the at least one processing device, causes the at least one processing device to identify, from the resources associated with the user, other relevant resources associated with multiple entities in proximity to the location of the user device, where the entity and the multiple entities include merchants and service providers.

In some embodiments, the at least one non-transitory storage device may include computer-executable program code that, when executed by the at least one processing device, causes the at least one processing device to identify, based on the location data and based on other location data generated by other user devices associated with other users, proximate users in proximity to the location of the user device.

In some embodiments, the at least one non-transitory storage device may include computer-executable program code that, when executed by the at least one processing device, causes the at least one processing device to identify, from the resources associated with the user, expiring resources, generate an expiration notification including expiration information regarding the expiring resources, present, using the output device of the user device, the expiration notification to the user, where the expiration notification includes a user interface including a donation input, receive, from the user, user input to the user interface selecting the donation input, and transmit, in response to receiving the user input to the user interface selecting the donation input, the expiring resources from a source retainer associated with the user to a community source retainer, where the community source retainer permits other users to claim the expiring resources. Additionally, or alternatively, the at least one non-transitory storage device may include computer-executable program code that, when executed by the at least one processing device, causes the at least one processing device to identify, based on the location data and based on other location data generated by other user devices associated with other users, proximate users in proximity to the location of the user device, generate availability notifications including the expiration information regarding the expiring resources, and present, using output devices of the other user devices, the availability notifications to the other users, where the availability notifications include user interfaces including claim inputs permitting the other users to claim one or more of the expiring resources.

In some embodiments, the at least one non-transitory storage device may include computer-executable program code that, when executed by the at least one processing device, causes the at least one processing device to determine, based on the location data, whether the user is at a transportation center, determine, in response to determining that the user is at the transportation center and based on calendar data stored in the user device, whether a difference between a current time and a time associated with a planned departure from the transportation center satisfies a threshold, generate, based on determining that the difference satisfies the threshold and, a first notification, and present, using the output device of the user device, the first notification to the user. Additionally, or alternatively, the at least one non-transitory storage device may include computer-executable program code that, when executed by the at least one processing device, causes the at least one processing device to determine, using the emotional artificial intelligence engine, suggested activities for the user, where the first notification includes information associated with the suggested activities for the user.

In some embodiments, the information regarding the relevant resources in the notifications may include terminology based on the location data.

In some embodiments, the output device may include at least one of a display, a touch screen, a speaker, a light, and/or the like.

In another aspect, the present invention embraces a computer program product for controlling electronic communications in real time via an artificial intelligence engine based on location data and user data. The computer program product may include a non-transitory computer-readable medium including code that, when executed by a first apparatus, causes the first apparatus to determine a location of a user device associated with a user based on location data generated by the user device and determine, using an emotional artificial intelligence engine, an emotional state of the user based on user data. The computer program product may include a non-transitory computer-readable medium including code that, when executed by a first apparatus, causes the first apparatus to determine resources associated with the user and identify, from the resources associated with the user, relevant resources associated with an entity in proximity to the location of the user device. The computer program product may include a non-transitory computer-readable medium including code that, when executed by a first apparatus, causes the first apparatus to generate, based on the emotional state of the user, notifications including information regarding the relevant resources and present, using an output device of the user device, the notifications to the user.

In some embodiments, the computer program product may include a non-transitory computer-readable medium including code that, when executed by a first apparatus, causes the first apparatus to receive the location data from the user device.

In some embodiments, the computer program product may include a non-transitory computer-readable medium including code that, when executed by a first apparatus, causes the first apparatus to receive the location data from a Global Positioning System (GPS) receiver module.

In yet another aspect, a method for controlling electronic communications in real time via an artificial intelligence engine based on location data and user data is presented. The method may include determining a location of a user device associated with a user based on location data generated by the user device and determining, using an emotional artificial intelligence engine, an emotional state of the user based on user data. The method may include determining resources associated with the user and identifying, from the resources associated with the user, relevant resources associated with an entity in proximity to the location of the user device. The method may include generating, based on the emotional state of the user, notifications including information regarding the relevant resources and presenting, using an output device of the user device, the notifications to the user.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
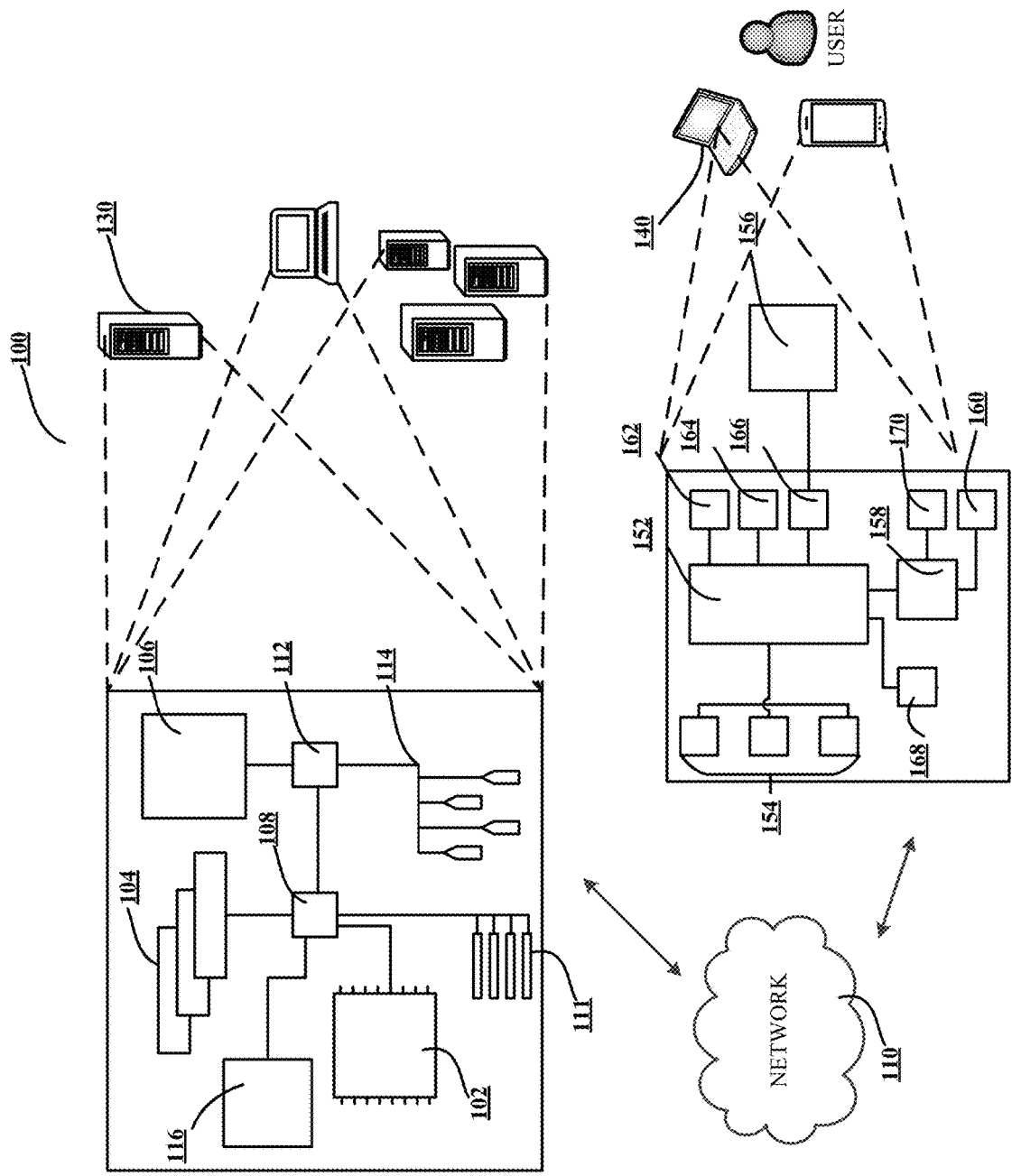
Figure 2:
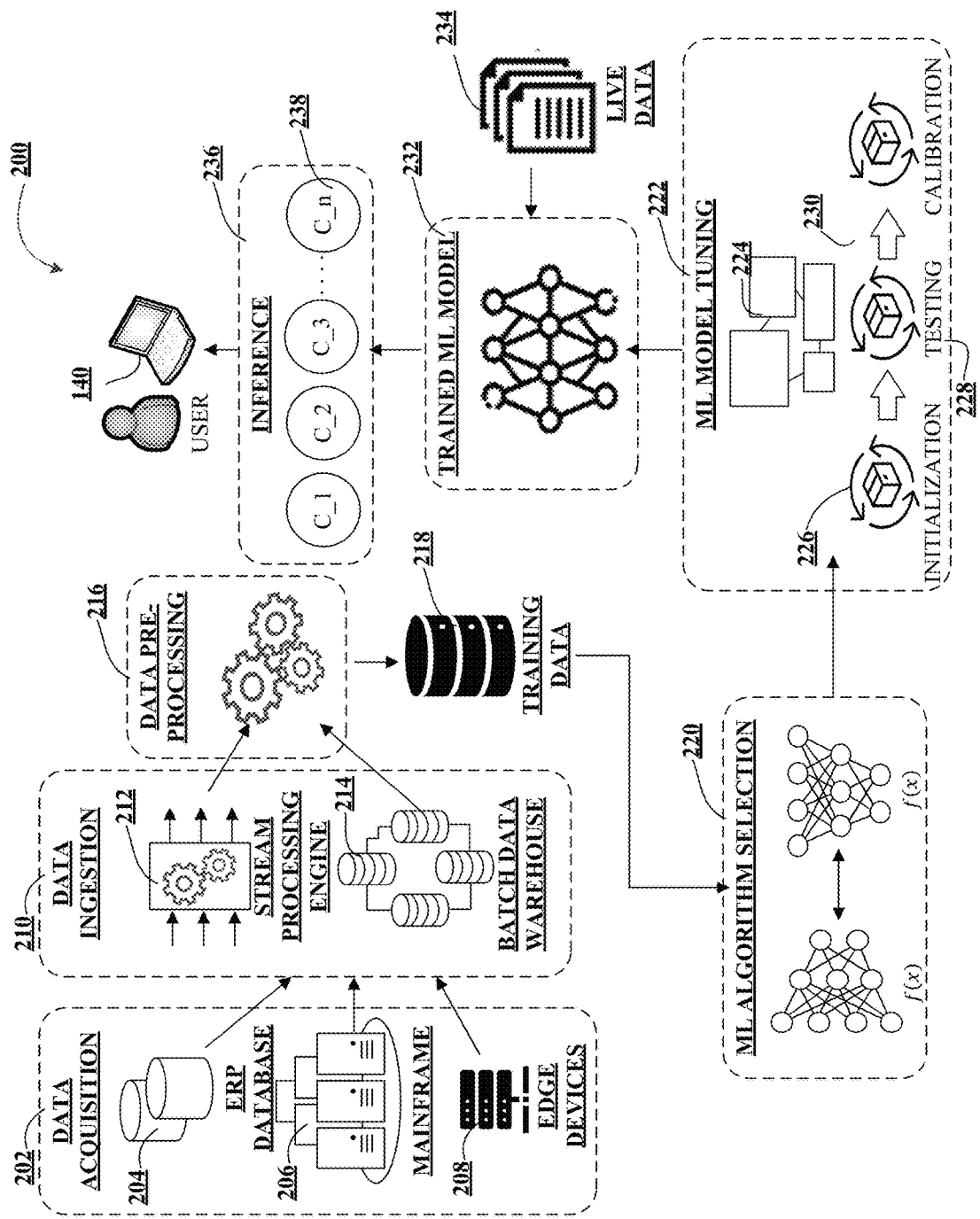
Figure 3:
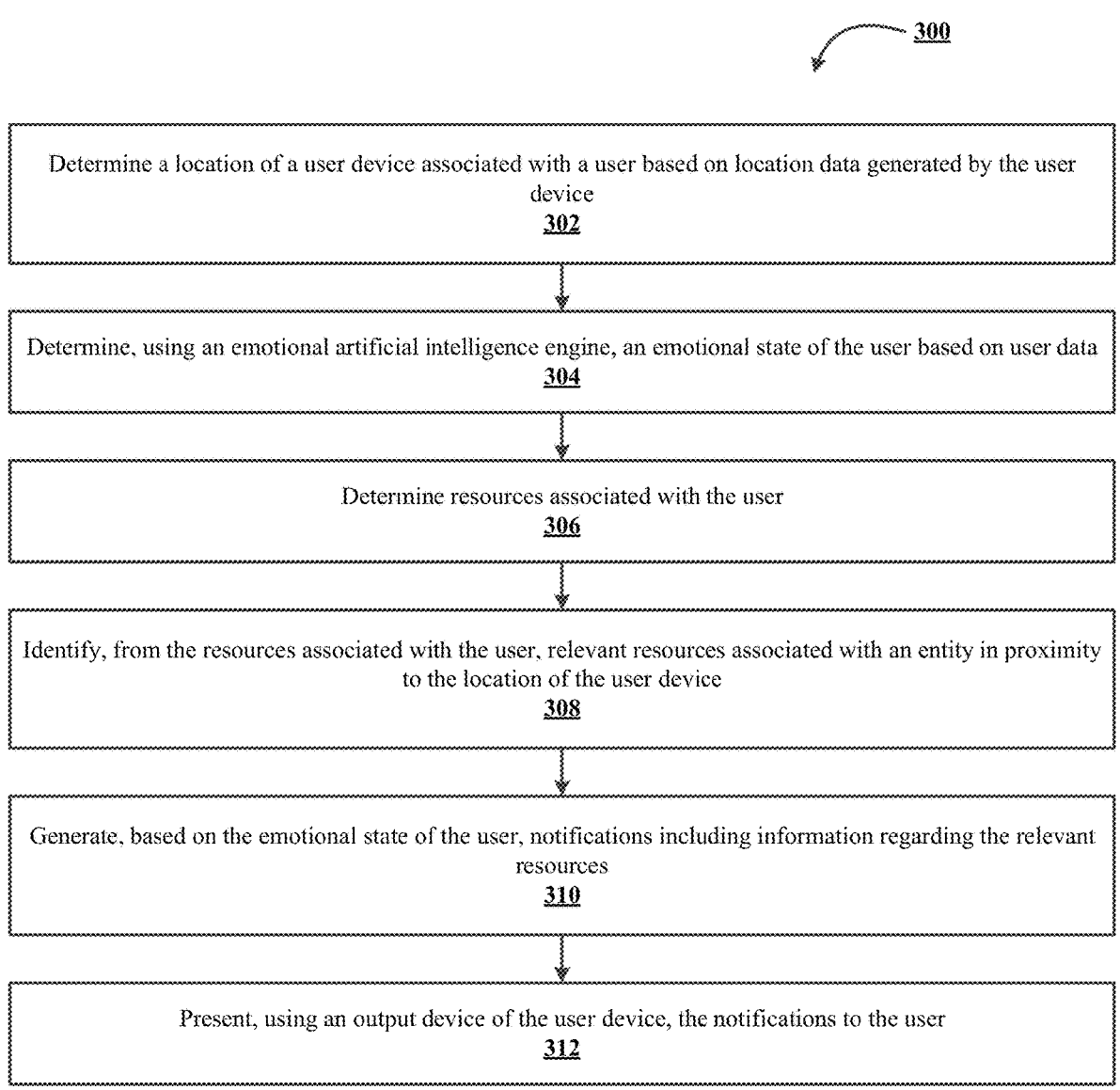

Having thus described embodiments of the invention in general terms, reference will now be made the accompanying drawings, wherein:

FIG. 1 illustrates technical components of a system for controlling electronic communications in real time via an artificial intelligence engine based on location data and user data, in accordance with an embodiment of the invention;

FIG. 2 illustrates an exemplary machine learning (ML) subsystem architecture, in accordance with an embodiment of the invention; and FIG. 3 illustrates an exemplary process flow for controlling electronic communications in real time via an artificial intelligence engine based on location data and user data, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual (e.g., associated with an entity). As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution," a "transfer," and/or an "allocation" may refer to any transaction, activities, and/or communication between one or more entities, between a user and one or more entities, and/or the like. A resource distribution, a resource transfer, and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for controlling electronic communications in real time via an artificial intelligence engine based on location data and user data within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for controlling electronic communications in real time via an artificial intelligence engine based on location data and user data, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In some embodiments, the memory 104 may be a volatile memory unit or units, such as volatile random-access memory (RAM) having a cache area for the temporary storage of information. In some embodiments, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include one or more electronic communication controller systems and/or platforms, one or more user devices, systems, and/or platforms, one or more notification generating systems and/or platforms, one or more emotional artificial intelligence systems and/or engines, entity systems, entity devices, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more electronic communication controller systems and/or platforms, one or more user devices, systems, and/or platforms, one or more notification generating systems and/or platforms, one or more emotional artificial intelligence systems and/or engines, entity systems, entity devices, and/or the like may perform one or more of the steps described herein with respect to the process flows described herein with respect to FIGS. 2 and 3.

FIG. 2 illustrates an exemplary machine learning (ML) subsystem 200, in accordance with an embodiment of the invention. The machine learning subsystem 200 may include a data acquisition engine 202, a data ingestion engine 210, a data pre-processing engine 216, an ML model tuning engine 222, an inference engine 236, and/or the like.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 204, 206, and 208 may include Enterprise Resource Planning (ERP) databases that host data related to day-to-day business activities such as accounting, procurement, project management, exposure management, supply chain operations, and/or the like, a mainframe that is often the entity's central data processing center, edge devices that may be any piece of hardware, such as sensors, actuators, gadgets, appliances, machines, and/or the like, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using a stream processing engine 212, in batches using a batch data warehouse 214, and/or a combination of both. The stream processing engine 212 may be used to process a continuous data stream (e.g., data from edge devices), i.e., computing on data directly as the data is received, and filter the incoming data to retain specific portions that are deemed useful by aggregating, analyzing, transforming, and ingesting the data. In some embodiments, the batch data warehouse 214 may collect and transfer data in batches according to scheduled intervals, trigger events, and/or any other ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, and/or format of the data using generalization, normalization, attribute selection, and/or aggregation, data cleaning by filling missing values, smoothing the noisy data, resolving the inconsistency, removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, the training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and/or speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making predictions about a dataset.

The machine learning algorithms contemplated, described, and/or used herein include supervised learning (e.g., using logistic regression, using back propagation neural networks, using random forests, decision trees, and/or the like), unsupervised learning (e.g., using an Apriori algorithm, using K-means clustering, and/or the like), semi-supervised learning, reinforcement learning (e.g., using a Q-learning algorithm, using temporal difference learning, and/or the like), and/or any other suitable machine learning model type. Each of these types of machine learning algorithms may implement any of one or more of a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm, the value of alpha in a linear algorithm, and/or the like), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 ... C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 ... C_n 238) live data 234 based on how similar they are to one another to solve exploratory challenges where little is known about the data, provide a description or label (e.g., C_1, C_2 ... C_n 238) to live data 234, such as in classification, and/or the like. These categorized outputs, groups (clusters), or labels are then presented to the user input system 140. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

As noted, an electronic system may be configured to generate notifications including information regarding resources associated with a user. For example, the electronic system may be configured to generate the notifications and present the notifications to the user via a user device. However, the notifications may present information to the user about resources that are not relevant to the user at the time and/or location that the notifications are presented. Furthermore, depending on the emotional state of the user, the notifications may frustrate, annoy, anger, upset, and/or otherwise bother the user such that the emotional state of the user becomes more negative after the notifications are presented. Presenting information about resources that are not relevant to the user and/or presenting notifications that are detrimental to the emotional state of the user decreases the likelihood that the user will engage with the notification in a positive manner. Stated differently, presenting such notifications reduces the effectiveness of the notifications. Presenting ineffective notifications to a user consumes significant computing resources (e.g., processing resources, memory resources, power resources, communication resources, and/or the like) and/or network resources of a user device and/or system generating and/or presenting the notifications.

Some embodiments described herein provide a system, a computer program product, and/or a method for controlling electronic communications in real time via an artificial intelligence engine based on location data and user data. For example, a system (e.g., an electronic system for controlling electronic communications in real time via an artificial intelligence engine based on location data and user data and/or the like) may be configured to determine the location of a user device, determine an emotional state of a user (e.g., based on the user's voice, user input to the user device, the location, and/or the like) using an emotional artificial intelligence engine, and generate and present, based on the location and the emotional state, notifications including information about resources (e.g., coupons, offers, discounts, gift cards, and/or the like) that are relevant to entities and/or users in proximity to the location of the user device. For example, if a user walks by a store, the system may determine that the user is near the store, determine that the user likes products in the store (e.g., based on the emotional state and/or user data), determine that the user has unredeemed coupons and/or gift cards for the store, and generate and present a notification to the user about the unredeemed coupon and/or gift cards. As another example, if a user has a delayed flight, the system may determine the emotional state of the user (e.g., bored, frustrated, mad, hungry, and/or the like), determine the location of the user, determine resources associated with the user (e.g., a movie, an entertainment application, a podcast, an online art exhibit, a calming session on an application, a coupon and/or a gift card for a restaurant near the user, and/or the like) and generate and present a notification to the user about the resources. If the user wants to donate an unused and/or soon-to-expire resource (e.g., coupon, offer, discount, gift card, movie, entertainment application, and/or the like), the system may permit the user to donate the resource to others in proximity to the user (e.g., anonymously), to a pool of donated resources available to anyone, to a friend and/or a family member (e.g., with an account linked and/or associated with an account of the user), and/or the like. The system may also permit the user to exchange resources (e.g., coupons, offers, discounts, gift cards, and/or the like) for stores that are not near the user for resources of stores that are near the user. The system may determine the emotional state of the user using the emotional artificial intelligence engine and various factors, such as the location of the user, the life stage of the user, the tone of the user's voice, understanding of slang words or phrases, and/or the like. By determining the location of the user, determining the emotional state of the user using the emotional artificial intelligence engine, identifying relevant resources associated with the user, and generating notifications including information regarding the relevant resources based on the emotional state of the user, the system increases the effectiveness of the notifications. By increasing the effectiveness of the notifications, the system conserves computing resources (e.g., processing resources, memory resources, power resources, communication resources, and/or the like) and/or network resources that would otherwise be consumed by generating and presenting ineffective notifications to the user.

FIG. 3 illustrates an exemplary process flow 300 for controlling electronic communications in real time via an artificial intelligence engine based on location data and user data, in accordance with an embodiment of the invention. In some embodiments, one or more systems for controlling electronic communications in real time via an artificial intelligence engine based on location data and user data, such as one or more electronic communication controller systems and/or platforms, one or more user devices, systems, and/or platforms, one or more notification generating systems and/or platforms, one or more emotional artificial intelligence systems and/or engines, entity systems, entity devices, and/or the like (e.g., similar to one or more of the systems described herein with respect to FIGS. 1 and 2) associated with one or more entities (e.g., businesses, merchants, financial institutions, card management institutions, software and/or hardware development companies, software and/or hardware testing companies, and/or the like), may perform one or more of the steps of process flow 300.

As shown in block 302, the process flow 300 may include determining a location of a user device associated with a user based on location data generated by the user device. For example, a system for controlling electronic communications in real time via an artificial intelligence engine based on location data and user data may determine a location of a user device associated with a user based on location data generated by the user device.

As shown in block 304, the process flow 300 may include determining, using an emotional artificial intelligence engine, an emotional state of the user based on user data. For example, a system for controlling electronic communications in real time via an artificial intelligence engine based on location data and user data may determine, using an emotional artificial intelligence engine, an emotional state of the user based on user data. In some embodiments, the emotional artificial intelligence engine may include and/or utilize one or more machine learning subsystems similar to the machine learning subsystem 200 shown and described herein with respect to FIG. 2. Additionally, or alternatively, the emotional artificial intelligence engine may include and/or utilize one or more machine learning models similar to the machine learning model 224 shown and described herein with respect to FIG. 2.

As shown in block 306, the process flow 300 may include determining resources associated with the user. For example, a system for controlling electronic communications in real time via an artificial intelligence engine based on location data and user data may determine resources associated with the user. In some embodiments, the process flow 300 may include determining the resources associated with the user by accessing and/or querying one or more databases including information regarding source retainers (e.g., rewards accounts, rewards points accounts, benefit rewards accounts, bonus miles accounts, cash back accounts, coupon accounts, digital wallets, and/or the like) associated with the user.

As shown in block 308, the process flow 300 may include identifying, from the resources associated with the user, relevant resources associated with an entity in proximity to the location of the user device. For example, a system for controlling electronic communications in real time via an artificial intelligence engine based on location data and user data may identify, from the resources associated with the user, relevant resources associated with an entity in proximity to the location of the user device. In some embodiments, the process flow 300 may include identifying the relevant resources by determining locations for each of the entities associated with the resources associated with the user, determining whether distances between the locations for each of the entities and the location of the user device satisfy a threshold, and determining that one or more of the entities are in proximity to the location of the user device based on the distances between the locations of the one more entities and the location of the user device satisfying the threshold. For example, the threshold may correspond to a walking distance (e.g., a mile or less, a half-mile or less, and/or the like), a driving distance (e.g., 200 miles or less, 150 miles or less, 100 miles or less, 50 miles or less, 25 miles or less, 20 miles or less, 15 miles or less, 10 miles or less, 5 miles or less, and/or the like), a distance established via user input (e.g., by adjusting a setting in an application and/or the like), a predetermined distance, and/or the like.

As shown in block 310, the process flow 300 may include generating, based on the emotional state of the user, notifications including information regarding the relevant resources. For example, a system for controlling electronic communications in real time via an artificial intelligence engine based on location data and user data may generate, based on the emotional state of the user, notifications including information regarding the relevant resources.

As shown in block 312, the process flow 300 may include presenting, using an output device of the user device, the notifications to the user. For example, a system for controlling electronic communications in real time via an artificial intelligence engine based on location data and user data may present, using an output device of the user device, the notifications to the user. Additionally, or alternatively, the process flow 300 may include transmitting, to an email account associated with the user, an email including the notification and/or the information regarding the relevant resources. In some embodiments, the process flow 300 may include transmitting, to the user device, a text message including the notification and/or the information regarding the relevant resources.

Process flow 300 may include additional embodiments, such as any single embodiment or any combination of embodiments described below and/or in connection with one or more other processes described elsewhere herein.

In a first embodiment, the process flow 300 may include receiving the location data from the user device.

In a second embodiment alone or in combination with the first embodiment, the process flow 300 may include receiving the location data from a Global Positioning System (GPS) receiver module.

In a third embodiment alone or in combination with any of the first through second embodiments, the user data may include at least one of input data manually input to the user device by the user, audio data collected by the user device, local operator data stored in the user device, and remote operator data stored remotely from the user device.

In a fourth embodiment alone or in combination with any of the first through third embodiments, the process flow 300 may include, when determining, using the emotional artificial intelligence engine, the emotional state of the user, determining, using the emotional artificial intelligence engine, the emotional state of the user based on the user data and based on the location data.

In a fifth embodiment alone or in combination with any of the first through fourth embodiments, the process flow 300 may include, when determining, using the emotional artificial intelligence engine, the emotional state of the user, determining, using the emotional artificial intelligence engine, the emotional state of the user based on terminology used by the user and based on the location data, where the terminology includes at least one of words and phrases used by the user.

In a sixth embodiment alone or in combination with any of the first through fifth embodiments, the process flow 300 may include, when determining, using the emotional artificial intelligence engine, the emotional state of the user, determining, using the emotional artificial intelligence engine, the emotional state of the user based on terminology used by the user, based on a tone of voice used by the user, and based on the location data, where the terminology includes at least one of words and phrases used by the user.

In a seventh embodiment alone or in combination with any of the first through sixth embodiments, the process flow 300 may include, when determining the resources associated with the user, determining at least one of offers, discounts, cash equivalents, rewards, and credits that the user owns or for which the user is eligible.

In an eighth embodiment alone or in combination with any of the first through seventh embodiments, the process flow 300 may include identifying, from the resources associated with the user, other relevant resources associated with multiple entities in proximity to the location of the user device, where the entity and the multiple entities include merchants and service providers. In some embodiments, the process flow 300 may include identifying the other relevant resources by determining locations for each of the entities associated with the resources associated with the user, determining whether distances between the locations for each of the entities and the location of the user device satisfy a threshold, and determining that one or more of the entities are in proximity to the location of the user device based on the distances between the locations of the one more entities and the location of the user device satisfying the threshold. For example, the threshold may correspond to a walking distance (e.g., a mile or less, a half-mile or less, and/or the like), a driving distance (e.g., 200 miles or less, 150 miles or less, 100 miles or less, 50 miles or less, 25 miles or less, 20 miles or less, 15 miles or less, 10 miles or less, 5 miles or less, and/or the like), a distance established via user input (e.g., by adjusting a setting in an application and/or the like), a predetermined distance, and/or the like.

In a ninth embodiment alone or in combination with any of the first through eighth embodiments, the process flow 300 may include identifying, based on the location data and based on other location data generated by other user devices associated with other users, proximate users in proximity to the location of the user device. In some embodiments, the process flow 300 may include identifying the proximate users by determining whether distances between the locations for each of the other users and the location of the user device satisfy a threshold, and determining that the proximate users, of the other users, are in proximity to the location of the user device based on the distances between the locations of the proximate users and the location of the user device satisfying the threshold. For example, the threshold may correspond to a walking distance (e.g., a mile or less, a half-mile or less, and/or the like), a driving distance (e.g., 200 miles or less, 150 miles or less, 100 miles or less, 50 miles or less, 25 miles or less, 20 miles or less, 15 miles or less, 10 miles or less, 5 miles or less, and/or the like), a distance established via user input (e.g., by adjusting a setting in an application and/or the like), a predetermined distance, and/or the like.

In a tenth embodiment alone or in combination with any of the first through ninth embodiments, the process flow 300 may include identifying, from the resources associated with the user, expiring resources, generating an expiration notification including expiration information regarding the expiring resources, presenting, using the output device of the user device, the expiration notification to the user, where the expiration notification includes a user interface including a donation input, receiving, from the user, user input to the user interface selecting the donation input, and transmitting, in response to receiving the user input to the user interface selecting the donation input, the expiring resources from a source retainer associated with the user to a community source retainer, where the community source retainer permits other users to claim the expiring resources. For example, other users may be able to view, via an application and/or web browser, expiring resources in the community source retainer, select expiring resources to claim, and receive the claimed expiring resources (e.g., in a source retainer, a digital wallet, and/or the like).

In an eleventh embodiment alone or in combination with any of the first through tenth embodiments, the process flow 300 may include identifying, based on the location data and based on other location data generated by other user devices associated with other users, proximate users in proximity to the location of the user device, generating availability notifications including the expiration information regarding the expiring resources, and presenting, using output devices of the other user devices, the availability notifications to the other users, where the availability notifications include user interfaces including claim inputs permitting the other users to claim one or more of the expiring resources.

In a twelfth embodiment alone or in combination with any of the first through eleventh embodiments, the process flow 300 may include determining, based on the location data, whether the user is at a transportation center (e.g., an airport, a train station, a bus station, a taxi station, a helipad, and/or the like), determining, in response to determining that the user is at the transportation center and based on calendar data stored in the user device, whether a difference between a current time and a time associated with a planned departure from the transportation center satisfies a threshold, generating, based on determining that the difference satisfies the threshold and, a first notification, and presenting, using the output device of the user device, the first notification to the user.

In a thirteenth embodiment alone or in combination with any of the first through twelfth embodiments, the process flow 300 may include determining, using the emotional artificial intelligence engine, suggested activities for the user, where the first notification includes information associated with the suggested activities for the user. For example, the suggested activities may include options to use resources (e.g., coupons, offers, discounts, gift cards, and/or the like) that are relevant to entities and/or users in proximity to the location of the user device, resources (e.g., a movie, an entertainment application, a podcast, an online art exhibit, a calming session on an app, a coupon and/or a gift card for a restaurant near the user, and/or the like) to entertain the user, and/or the like.

In a fourteenth embodiment alone or in combination with any of the first through thirteenth embodiments, the information regarding the relevant resources in the notifications may include terminology based on the location data. For example, the notifications may use terminology, such as words, phrases, expressions, and/or the like, that are common to the location of the user, that are unique to the location of the user as compared to other locations, that have a unique meaning in the location of the user, that are currently popular in the location of the user. Additionally, or alternatively, the notifications may user terminology, such as words, phrases, expressions, and/or the like, that are commonly used by user's similar to the user (e.g., of a similar life stage, have a similar profession, have similar interests, and/or the like).

In a fifteenth embodiment alone or in combination with any of the first through fourteenth embodiments, the output device may include at least one of a display, a touch screen, a speaker, and a light.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for controlling electronic communications in real time via an artificial intelligence engine based on location data and user data, the system comprising:
   at least one processing device; and
   at least one non-transitory storage device comprising computer-executable program code that, when executed by the at least one processing device, causes the at least one processing device to:
      determine a location of a user device associated with a user based on location data received from a Global Positioning System (GPS) receiver module of the user device;
      determine, using an emotional artificial intelligence engine, an emotional state of the user based on user data;
      determine resources associated with the user;
      identify, from the resources associated with the user, relevant resources associated with an entity in proximity to the location of the user device;
      generate, based on the emotional state of the user, notifications comprising information regarding the relevant resources;

present, using an output device of the user device, the notifications to the user, wherein the notifications comprise a user interface comprising a plurality of donation inputs;

receive, from the user, user input to the user interface selecting a first donation input of the plurality of donation inputs associated with a resource of the relevant resources; and anonymously transmit, in response to receiving the user input to the user interface selecting the first donation input, the resource from a source retainer associated with the user to a community source retainer, wherein the community source retainer permits other users to anonymously claim the resource.

2. The system of claim 1, wherein the at least one non-transitory storage device comprises computer-executable program code that, when executed by the at least one processing device, causes the at least one processing device to receive the location data from the user device.

3. The system of claim 1, wherein the user data comprises at least one of input data manually input to the user device by the user, audio data collected by the user device, local operator data stored in the user device, and remote operator data stored remotely from the user device.

4. The system of claim 1, wherein the at least one non-transitory storage device comprises computer-executable program code that, when executed by the at least one processing device, causes the at least one processing device to, when determining, using the emotional artificial intelligence engine, the emotional state of the user, determine, using the emotional artificial intelligence engine, the emotional state of the user based on the user data and based on the location data.

5. The system of claim 4, wherein the at least one non-transitory storage device comprises computer-executable program code that, when executed by the at least one processing device, causes the at least one processing device to, when determining, using the emotional artificial intelligence engine, the emotional state of the user, determine, using the emotional artificial intelligence engine, the emotional state of the user based on terminology used by the user and based on the location data, wherein the terminology comprises at least one of words and phrases used by the user.

6. The system of claim 4, wherein the at least one non-transitory storage device comprises computer-executable program code that, when executed by the at least one processing device, causes the at least one processing device to, when determining, using the emotional artificial intelligence engine, the emotional state of the user, determine, using the emotional artificial intelligence engine, the emotional state of the user based on terminology used by the user, based on a tone of voice used by the user, and based on the location data, wherein the terminology comprises at least one of words and phrases used by the user.

7. The system of claim 1, wherein the at least one non-transitory storage device comprises computer-executable program code that, when executed by the at least one processing device, causes the at least one processing device to, when determining the resources associated with the user, determine at least one of offers, discounts, cash equivalents, rewards, and credits that the user owns or for which the user is eligible.

8. The system of claim 1, wherein the at least one non-transitory storage device comprises computer-executable program code that, when executed by the at least one processing device, causes the at least one processing device to identify, from the resources associated with the user, other relevant resources associated with multiple entities in proximity to the location of the user device, wherein the entity and the multiple entities comprise merchants and service providers.

9. The system of claim 1, wherein the at least one non-transitory storage device comprises computer-executable program code that, when executed by the at least one processing device, causes the at least one processing device to identify, based on the location data and based on other location data generated by other user devices associated with other users, proximate users in proximity to the location of the user device.

10. The system of claim 1, wherein the at least one non-transitory storage device comprises computer-executable program code that, when executed by the at least one processing device, causes the at least one processing device to:

identify, based on the location data, based on other location data generated by other user devices associated with other users, and based on user input to the user interface selecting a second donation input of the plurality of donation inputs, proximate users in proximity to the location of the user device;

identify, from the resources associated with the user, expiring resources;

generate availability notifications comprising expiration information regarding the expiring resources; and anonymously present, using output devices of the other user devices, the availability notifications to the other users, wherein the availability notifications comprise user interfaces comprising claim inputs permitting the other users to claim one or more of the expiring resources.

11. The system of claim 1, wherein the at least one non-transitory storage device comprises computer-executable program code that, when executed by the at least one processing device, causes the at least one processing device to:

determine, based on the location data, whether the user is at a transportation center;

determine, in response to determining that the user is at the transportation center and based on calendar data stored in the user device, whether a difference between a current time and a time associated with a planned departure from the transportation center satisfies a threshold;

generate, based on determining that the difference satisfies the threshold and, a first notification; and present, using the output device of the user device, the first notification to the user.

12. The system of claim 11, wherein the at least one non-transitory storage device comprises computer-executable program code that, when executed by the at least one processing device, causes the at least one processing device to determine, using the emotional artificial intelligence engine, suggested activities for the user, and wherein the first notification comprises information associated with the suggested activities for the user.

13. The system of claim 1, wherein the information regarding the relevant resources in the notifications comprises terminology based on the location data.

14. The system of claim 1, wherein the output device comprises at least one of a display, a touch screen, a speaker, and a light.

15. A computer program product for controlling electronic communications in real time via an artificial intelligence engine based on location data and user data, the computer program product comprising a non-transitory computer-readable medium comprising code that, when executed by a first apparatus, causes the first apparatus to:
- determine a location of a user device associated with a user based on location data received from a Global Positioning System (GPS) receiver module of the user device;
- determine, using an emotional artificial intelligence engine, an emotional state of the user based on user data;
- determine resources associated with the user;
- identify, from the resources associated with the user, relevant resources associated with an entity in proximity to the location of the user device;
- generate, based on the emotional state of the user, notifications comprising information regarding the relevant resources;
- present, using an output device of the user device, the notifications to the user, wherein the notifications comprise a user interface comprising a plurality of donation inputs;
- receive, from the user, user input to the user interface selecting a first donation input of the plurality of donation inputs associated with a resource of the relevant resources; and
- anonymously transmit, in response to receiving the user input to the user interface selecting the first donation input, the resource from a source retainer associated with the user to a community source retainer, wherein the community source retainer permits other users to anonymously claim the resource.

16. The computer program product of claim 15, wherein the non-transitory computer-readable medium comprises code that, when executed by the first apparatus, causes the first apparatus to receive the location data from the user device.

17. The computer program product of claim 15, wherein the non-transitory computer-readable medium comprises code that, when executed by the first apparatus, causes the first apparatus to receive the location data from a Global Positioning System (GPS) receiver module.

18. The computer program product of claim 15, wherein the non-transitory computer-readable medium comprises code that, when executed by the first apparatus, causes the first apparatus to:
- identify, based on the location data, based on other location data generated by other user devices associated with other users, and based on user input to the user interface selecting a second donation input of the plurality of donation inputs, proximate users in proximity to the location of the user device;
- identify, from the resources associated with the user, expiring resources;
- generate availability notifications comprising expiration information regarding the expiring resources; and
- anonymously present, using output devices of the other user devices, the availability notifications to the other users, wherein the availability notifications comprise user interfaces comprising claim inputs permitting the other users to claim one or more of the expiring resources.

19. A method for controlling electronic communications in real time via an artificial intelligence engine based on location data and user data, the method comprising:
- determining a location of a user device associated with a user based on location data received from a Global Positioning System (GPS) receiver module of the user device;
- determining, using an emotional artificial intelligence engine, an emotional state of the user based on user data;
- determining resources associated with the user;
- identifying, from the resources associated with the user, relevant resources associated with an entity in proximity to the location of the user device;
- generating, based on the emotional state of the user, notifications comprising information regarding the relevant resources;
- presenting, using an output device of the user device, the notifications to the user, wherein the notifications comprise a user interface comprising a plurality of donation inputs;
- receiving, from the user, user input to the user interface selecting a first donation input of the plurality of donation inputs associated with a resource of the relevant resources; and
- anonymously transmitting, in response to receiving the user input to the user interface selecting the first donation input, the resource from a source retainer associated with the user to a community source retainer, wherein the community source retainer permits other users to anonymously claim the resource.

20. The method of claim 19, the method further comprising:
- identifying, based on the location data, based on other location data generated by other user devices associated with other users, and based on user input to the user interface selecting a second donation input of the plurality of donation inputs, proximate users in proximity to the location of the user device;
- identifying, from the resources associated with the user, expiring resources;
- generating availability notifications comprising expiration information regarding the expiring resources; and
- anonymously presenting, using output devices of the other user devices, the availability notifications to the other users, wherein the availability notifications comprise user interfaces comprising claim inputs permitting the other users to claim one or more of the expiring resources.

\* \* \* \* \*